US010088842B2

United States Patent
Schmidt et al.

(10) Patent No.: US 10,088,842 B2
(45) Date of Patent: Oct. 2, 2018

(54) ISOBUS WIRELESS NETWORKING OF AGRICULTURAL MACHINES IN A COLLABORATIVE AGRICULTURAL PROCESS

(71) Applicant: AGCO Corporation, Hesston, KS (US)

(72) Inventors: Kyle Kenneth Schmidt, Newton, KS (US); Gerald R. Johnson, Hesston, KS (US); Timothy Dan Buhler, Newton, KS (US)

(73) Assignee: AGCO Corporation, Duluth, GA (US)

( * ) Notice: Subject to any disclaimer, the term of this patent is extended or adjusted under 35 U.S.C. 154(b) by 156 days.

(21) Appl. No.: 15/083,904

(22) Filed: Mar. 29, 2016

(65) Prior Publication Data
US 2017/0083026 A1 Mar. 23, 2017

Related U.S. Application Data

(60) Provisional application No. 62/140,210, filed on Mar. 30, 2015.

(51) Int. Cl.
| | |
|---|---|
| *G05D 1/00* | (2006.01) |
| *H04L 29/08* | (2006.01) |
| *H04L 12/66* | (2006.01) |
| *H04W 84/18* | (2009.01) |

(52) U.S. Cl.
CPC ......... *G05D 1/0027* (2013.01); *G05D 1/0022* (2013.01); *H04L 12/66* (2013.01); *H04L 67/12* (2013.01); *G05D 2201/0201* (2013.01); *H04W 84/18* (2013.01)

(58) Field of Classification Search
CPC .............. G05D 1/0027; G05D 1/0022; G05D 2201/0201; H04L 12/66; H04L 67/12; H04W 84/18
USPC .............................. 701/2, 36, 50; 172/4.5, 9
See application file for complete search history.

(56) References Cited

U.S. PATENT DOCUMENTS

2007/0073700 A1* 3/2007 Wippersteg .......... A01B 79/005
2016/0302351 A1* 10/2016 Schildroth .......... A01B 79/005

* cited by examiner

*Primary Examiner* — Gertrude Arthur Jeanglaude

(57) ABSTRACT

A system and method for performing an agricultural process involving a plurality of otherwise substantially independent agricultural machines, in which each machine is engaged in performing an aspect of the overall process. Each machine is placed in electronic communication with every other machine involved in the process using a standardized communication and control protocol such that the machines form a networked group. The performance of each machine is then, at least in part, substantially automatically synchronized with the performances of the other machines in the networked group based on relevant information electronically communicated by each machine. The machines may include unmanned agricultural implements, manned tractors, and trucks, and the system may be extended to include sensors and stations involved in the overall process. The protocol may be the ISO 11783 Compliant Implement Control standard, including the ISO 11783 Virtual Terminal standard.

22 Claims, 3 Drawing Sheets

ISOBUS WIRELESS NETWORKING OF AGRICULTURAL MACHINES IN A COLLABORATIVE AGRICULTURAL PROCESS

RELATED APPLICATION

Under provisions of 35 U.S.C. § 119(e), Applicant claims the benefit of U.S. Provisional Application No. 62/140,210, entitled and filed Mar. 30, 2015.

FIELD

The present invention relates to systems and methods for communicating and controlling the operation of agricultural machinery, particularly multiple otherwise independent agricultural machines engaged in various aspects of an overall collaborative agricultural process.

BACKGROUND

When operating multiple otherwise independent agricultural machines engaged in various aspects of an overall collaborative agricultural process, it is often desirable to synchronize their activities. Achieving synchronization is dependent on understanding the state and behavior of the various machines. In particular, aggregating data from some machines for use by other machines requires synchronization in order to understand which machines should be supported and which should be denied at any particular point in the process. Attempts to achieve synchronization depend on communication between and control by human operators, but this often results in many points of failure which prevent maximizing synchronization, which reduces the efficiency of the overall process.

This background discussion is intended to provide information related to the present invention which is not necessarily prior art.

SUMMARY

Embodiments of the present invention solve the above-described and other problems and limitations by providing for substantially automating the communication between and control of multiple otherwise independent agricultural machines engaged in various aspects of an overall collaborative agricultural process, and thereby eliminating many potential points of synchronization failure. This improves the efficiency of the overall process by reducing cost and improving productivity through increased speed, accuracy, and consistency.

In one embodiment, a system for performing the agricultural process may comprise the plurality of agricultural machines, wherein each machine is engaged in performing an aspect of the process, and each machine is in electronic communication with every other machine in the system using a standardized communication and control protocol such that the plurality of machines form a networked group. The performance of each machine is substantially synchronized with the performances of the other machines in the networked group based on information electronically communicated by each machine.

In various implementations of this embodiment, the system may further include any one or more of the following features. The plurality of machines may include a first machine having a hardwired network connection, a second machine having both a hardwired network connection to at least one first machine and a wireless network connection to at least one other second machine, and a third machine having a wireless network connection to at least one second machine. The first machine may be an unmanned agricultural implement, and the second machine may be a manned agricultural tractor connected via the hardwired network connection to the first machine. The substantial synchronization of the performances of machines may be achieved, at least in part, substantially automatically. The information may include geographic position, relative position, wayline position, speed, load level, and fill level.

The system may further include one or more sensors engaged in performing a sensor aspect of the agricultural process, with each sensor being in electronic communication with every other sensor and machine ion the system using the standardized communication and control protocol such that the sensors are also part of the networked group. The system may further include a station engaged in performing a station aspect of the agricultural process, with the station being in electronic communication with the sensors and the machines in the system using the standardized communication and control protocol such that the station is also part of the networked group.

The standardized communication and control protocol may be an ISO 11783 Compliant Implement Control standard. An ISO 11783 Virtual Terminal standard may be used to facilitate providing output to and receiving input from operators of the second and third machines. The second machine may have a computer area network bus, and an ISO 11783 Task Controller standard may be used to remotely inject Object Pools for the virtual terminal into this bus. An ISO 25119 Machine Directive standard may be used to facilitate communication between and control of the machines. The second machine may include a gateway device configured to extend the networked group to additional machines provided with wireless network connections.

Additionally, each of these embodiments and implementations may be alternatively characterized as methods based on their functionalities. In one embodiment, a method broadly comprises the steps of placing each agricultural machine in electronic communication with every other machine involved in the agricultural process using the standardized communication and control protocol such that the plurality of machines form the networked group, and then synchronizing the performance of each machine with the performances of the other machines in the networked group based on information electronically communicated by each machine.

In various implementations of this embodiment, the method may further include any one or more of the following steps. The method may further including the steps of incorporating a first set of the machines into the networked group, and then dynamically incorporating additional machines into the networked group. The method may further include the step of achieving a longer range for the networked group using a mesh networking technique wherein an intermediate gateway device associated with an intermediate machine is used to route communication from a remote gateway device associated with a remote machine which is otherwise beyond a communication range of the networked group.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly characterized, the present invention provides for substantially automating the communication between and control of multiple otherwise independent agricultural machines engaged in various aspects of an overall collaborative agricultural process, and thereby eliminating potential points of synchronization failure. This improves the efficiency of the overall process by reducing cost and improving productivity through increased speed, accuracy, and consistency.

Figure 1:
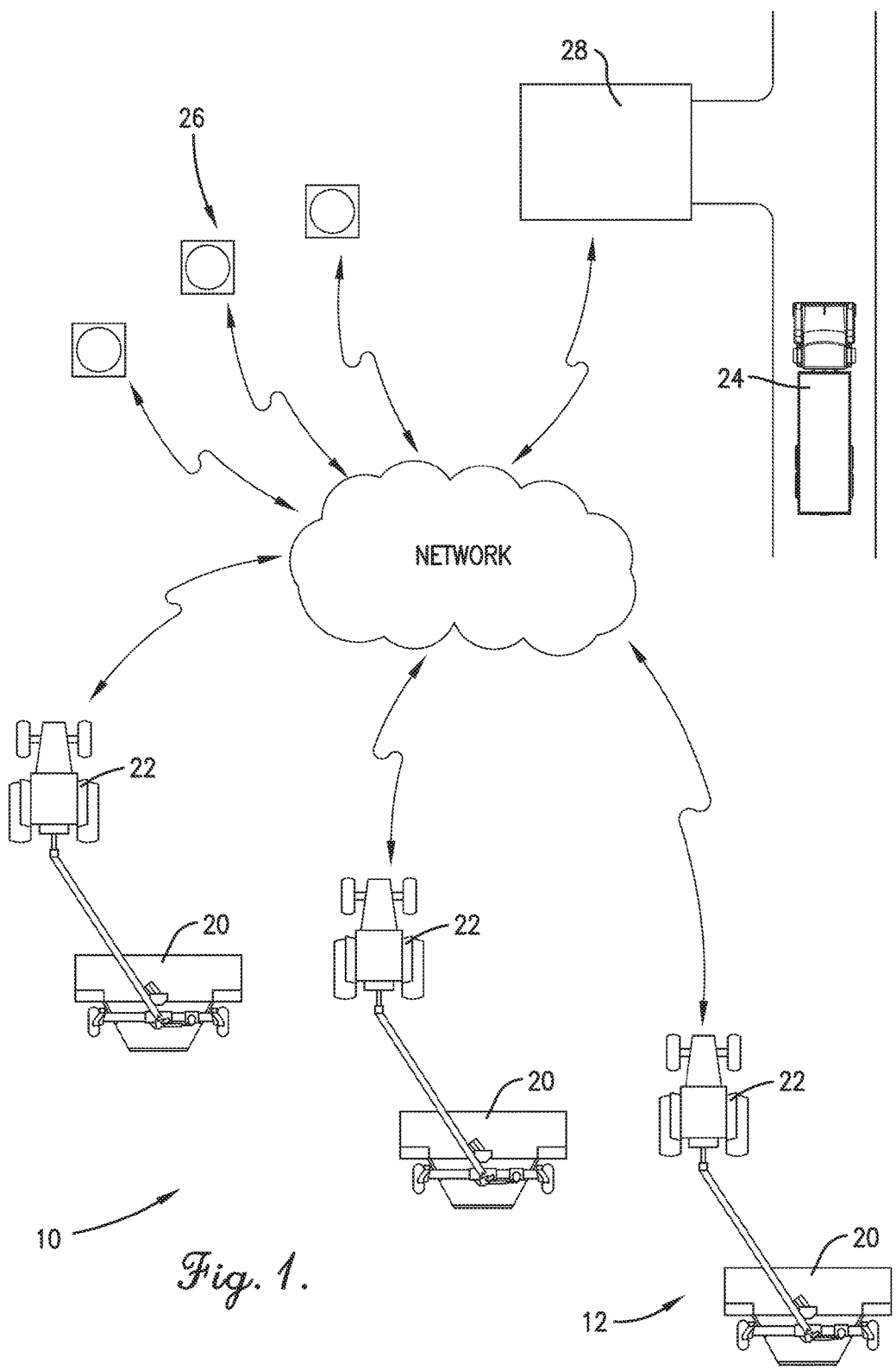
FIG. 1 is a depiction of an embodiment of the present invention in which a plurality of agricultural machines are networked to facilitate communication and control in order to synchronize the machines' efforts in a collaborative agricultural process.
Figure 2:
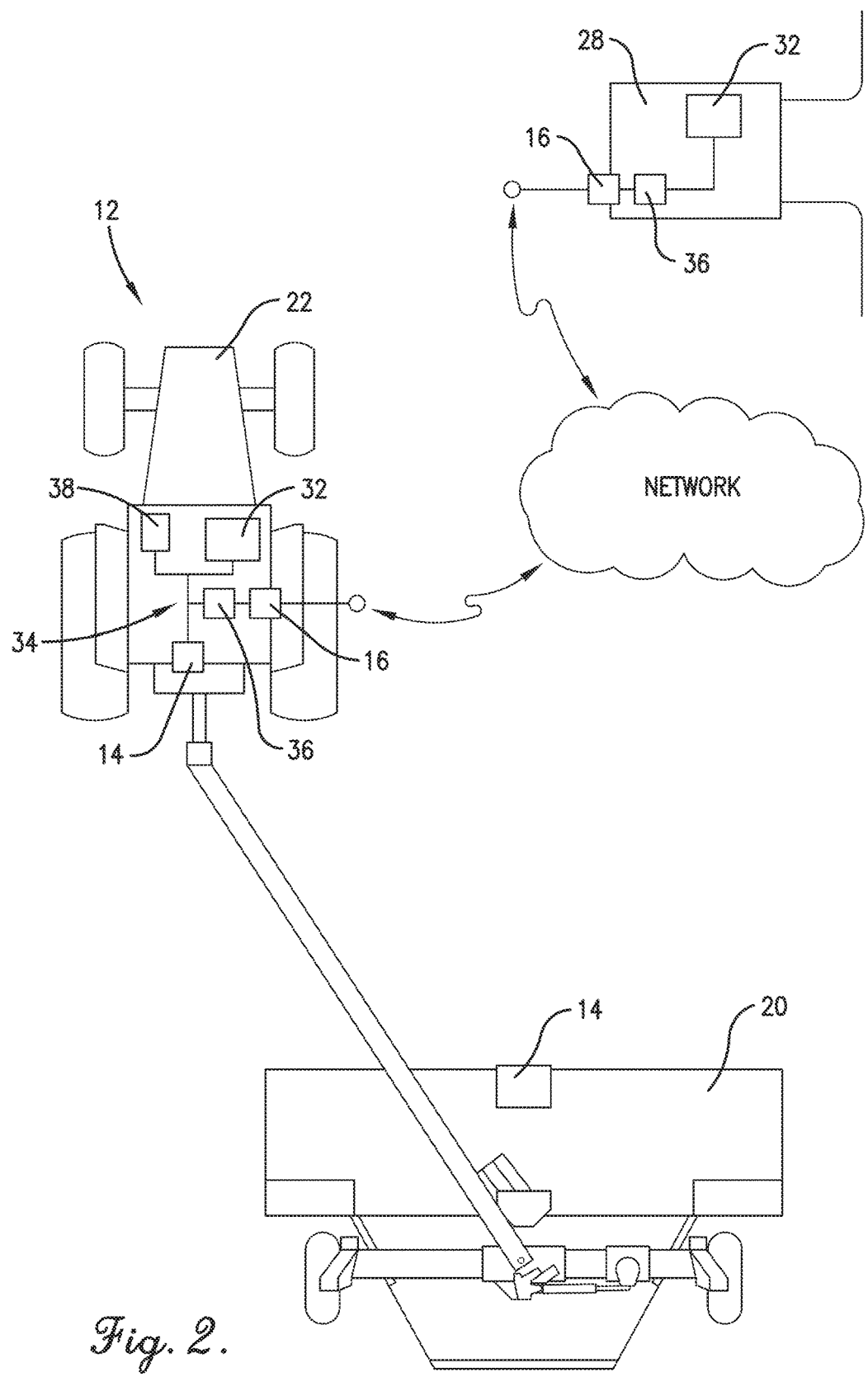
FIG. 2 is a depiction of two agricultural machines and a station of the embodiment of FIG. 1, wherein one of the machines is a tractor and another of the machines is an implement, and the station is also part of the networked group.

Referring to FIGS. 1 and 2, in one embodiment of the present invention, a system 10 broadly comprises the plurality of agricultural machines 12 engaged in aspects of the overall collaborative agricultural process (e.g., planting, spraying, harvesting), with each of the machines 12 being directly or indirectly in electronic communication with all of the other machines 12 via a hardwired network connector 14, a wireless network connector 16, or a combination thereof so as to form a networked machine group.

More specifically, the plurality of agricultural machines 12 may include one or more first machines 20 having hardwired ISOBUS connections 14, one or more second machines 22 having both hardwired and wireless ISOBUS connections 14,16, and one or more third machines 24 having wireless ISOBUS connections 16. The first machines 20 may be, for example, unmanned implements or other machines towed behind, physically coupled with, or otherwise operating in close association with or slaved to the second machines 22. The second machines 22 may be, for example, manned tractors or other machines towing, physically coupled with, or otherwise operating in close association or controlling the first machines 20. The third machines 24 may be, for example, implements, tractors, trucks, or other machines operating remote from or otherwise physically independent of the other machines but still engaged in various aspects of the overall collaborative agricultural process (e.g., delivering seed, pesticide, fertilizer, or other material to or removing harvested or other material from the first or second machines 20,22). Information communicated between these machines 20,22,24 may include, for example, geographic or relative position; speed; seed, pesticide, fertilizer, or other material fill level; or other information relevant to accomplishing the overall agricultural process.

In various implementations, the system 10 may further include one or more sensors 26 or one or more stations 28 engaged in sensing, monitoring, or performing various aspects of the overall collaborative agricultural process and directly or indirectly in electronic communication with the machines 12 via a hardwired or wireless ISOBUS connector 14,16 and therefore part of the networked group. For example, a sensor 26 may monitor an environmental characteristic (e.g., temperature, wind speed, humidity) which is relevant to the process, and a station 28 may order more seed, pesticide, fertilizer or other material or otherwise communicate with machines or agents which are not part of the networked group.

In one implementation, the machines 12 and other elements of the system 10 may use the ISO 11783 Compliant Implement Control ("ISOBUS") standard to create the networked group; the ISO 11783 Virtual Terminal standard to display standardized communication and control interfaces as "virtual terminals" 32; the ISO 11783 Task Controller communication protocol to remotely inject Object Pools for the virtual terminals 32 and the task controllers into a Controller Area Network Bus (CAN-BUS) 34 of the machines 12; and the ISO 25119 Machine Safety Directive to facilitate communication and control between machines 12.

More specifically, ISOBUS is an international communication and control standard that allows a terminal on a tractor or other machine to control and monitor an implement connected to the tractor or other machine. Virtual Terminal is an ISOBUS standard graphic display incorporating user inputs and outputs for one or more connected implements, wherein user interfaces are loaded from the connected implements. A lead from the implement 20 is plugged into the tractor's hardwired ISOBUS connector 14. The ISOBUS connector 14 is interfaced with the tractor's CAN-BUS 34, which allows for bidirectional data transfer between the implement 20 and the virtual terminal 32. Operating menus are automatically uploaded from the implement 20 and displayed on the virtual terminal 32. Thus, the ISOBUS standard allows a tractor or terminal produced by one manufacturer to communicate with and control an implement produced by the same or a different manufacturer via a hardwired connection and the standardized ISOBUS communication and control protocol.

The present invention may use the ISOBUS standard to allow multiple machines 12, including combinations of tractors 22, implements 20, trucks 24, other such agricultural machines, sensors 26, and stations 28 to communicate with and control each other via hardwired or wireless network connections 14,16. Thus, the present invention allows for incorporating into the networked group, communicating with, and controlling substantially any ISO 11783-compliant machine, subsystem, or device without substantial modifications.

The ISOBUS standards allow machines 20 with virtual terminals 32 to be used for the display device when a gateway device 36 is connected to the machine ISOBUS either through machine integration and design or by connecting to the machine's ISOBUS connector 14,16. Thus, in one implementation, the present invention may use a gateway device 36 as the hardware to extend the ISOBUS network to add machines 12 equipped with the wireless network connections 16. Network management may be initiated by a fleet operator to incorporate existing machines 12 into the networked group, and each machine 12 may be maintained in the networked group by the gateway device 36 on the machine 12. A graphical user interface (GUI) may be included on each gateway device 36 to allow for dynamically incorporating the additional machines 12 and displaying them in the networked group. Once a machine 12 is incorporated into the networked group, machine data may be shared using ISOBUS standards. The network GUI may be displayed on an existing virtual terminal 32 or on a mobile device 38.

In one implementation, a Fleet Manager may preload a list of the fleet of agricultural machines 12 into the gateway device 36. Each machine 12 may then request to join the networked group, and may be substantially automatically approved based on the machine's inclusion in the preloaded fleet list. If a requesting machine was not included in the preloaded fleet, the request may be denied or, alternatively, the gateway 36 receiving the request may prompt a local machine operator to approve or deny the request. The networked machines 12 may then negotiate the establishment of a cooperative field operation.

Once cooperation is established, the machines 12 may use the connection to extend the ISOBUS over the group of networked machines. The machines 12 may then use the extended ISOBUS to share object pools and behave as a virtual terminal 32 to display client machine data (e.g., harvester) on a server virtual terminal (e.g., tractor and grain cart), or may use the task controller for coverage mapping between multiple machines 12 through the network. This allows the machines 12 to exchange the data from and, in some situations, synchronize machine operating variables and settings, such that data from one machine 12 can be used to make decisions about how to operate another machine 12 in the networked group.

In one implementation, mesh networking techniques may be used to extend the network and achieve a longer range. This may be accomplished by using an intermediate gateway device associated with an intermediate machine to route communication from a remote gateway device associated with a remote machine which would otherwise be outside of the range of the networked group.

Figure 3:
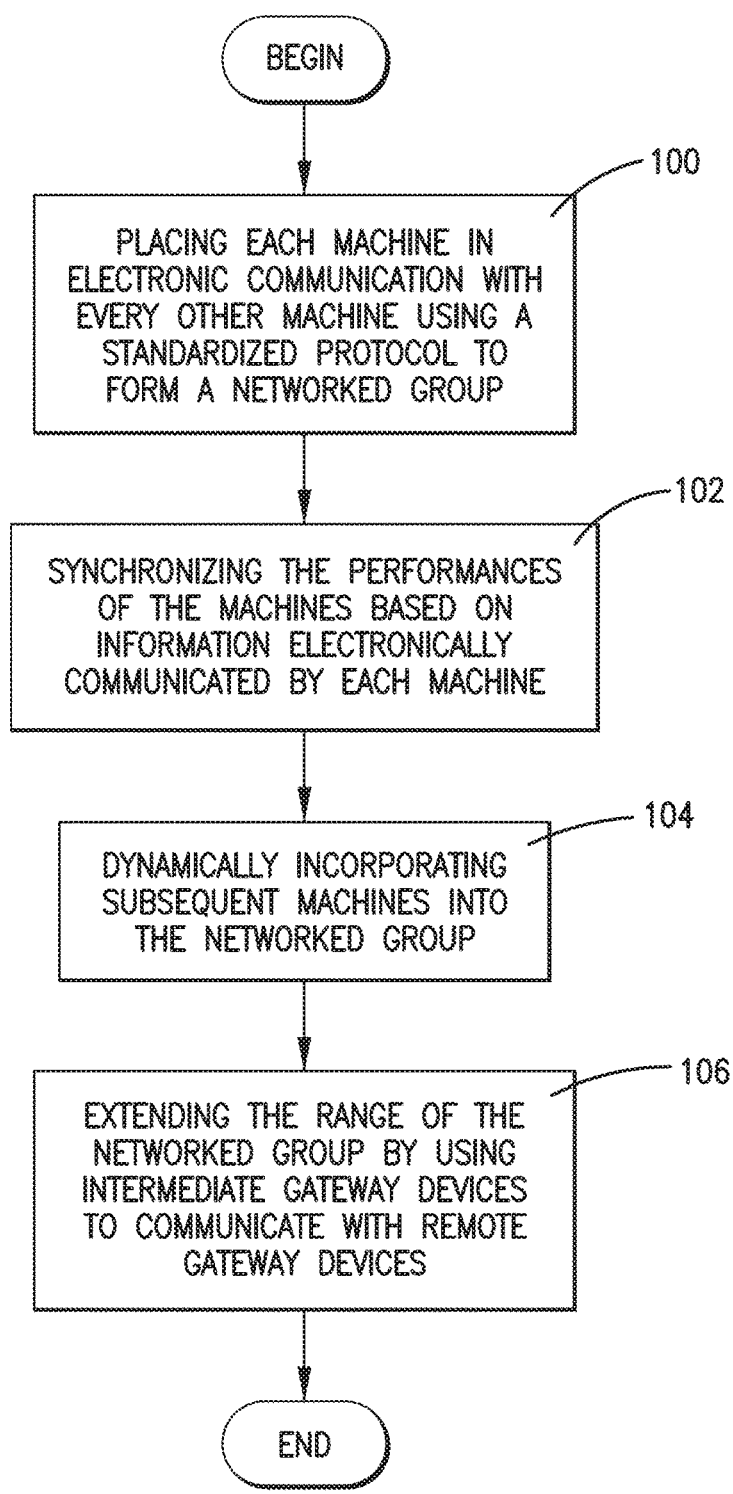
FIG. 3 is a flowchart if steps involved in a method reflecting the function of the embodiment of FIG. 1.

Referring also to FIG. 3, in operation, the system 10 may function substantially as follows to perform the agricultural process involving the plurality of agricultural machines 12, wherein each agricultural machine 12 is engaged in performing an aspect of the agricultural process. Broadly, each agricultural machine is placed in electronic communication with every other agricultural machine involved in the agricultural process using a standardized communication and control protocol such that the plurality of agricultural machines form a networked group, as shown in step 100. Then, the performance of the aspect of the agricultural process by each machine is substantially synchronized with the performances of the aspects of the agricultural process by the other agricultural machines based on information electronically communicated by each machine, as shown in step 102.

In various implementations, the method may include any one or more of the following additional steps. The method may further include the steps of incorporating a first set of the plurality of agricultural machines into the networked group, and then dynamically incorporating additional agricultural machines into the networked group, as shown in step 104. The method may further include the step of achieving a longer range for the networked group using a mesh networking technique wherein an intermediate gateway device associated with an intermediate machine is used to route communication from a remote gateway device associated with a remote machine which would otherwise be outside of the range of the networked group, as shown in step 106.

Thus, the present invention provides advantages over the prior art, including that it substantially automates the communication between and control of multiple otherwise independent agricultural machines engaged in aspects of an overall collaborative agricultural process, and thereby eliminates potential points of synchronization failure, which improves the efficiency of the overall process by reducing cost and improving productivity through increased speed, accuracy, and consistency.

In one exemplary implementation combine harvesters are used to harvest a field. The combine harvesters form a networked group such that each combine is directly or indirectly in wireless communication with each of the other combines using the ISOBUS communications protocol as explained above. Each combine operator is able to see, on his virtual terminal, objects from the other combines' object pools. By way of example, each operator is able to see machine variables and settings such as engine speed, ground speed, grain tank fill level, header reel speed and position, concave rod spacing, concave setting, rotor speed, cleaning fan speed, chaffer opening and sieve opening.

In addition to viewing objects from the object pool, each operator can select certain variables or settings to synchronize between the machines. An operator of a second machine may choose to synchronize concave rod spacing, concave setting, rotor speed, cleaning fan speed, chaffer opening and sieve opening of the second machine with a first machine. Once these settings are synchronized, the second machine automatically sets these variables to match the corresponding variables of the first machine. Additionally, communication between the machines allows the second machine to automatically adjust any of the synchronized variables to match adjustments of the variables in the first machine in real time or substantially real time. Thus, this may be advantageous where an operator of a first combine is particularly skilled at operating the combine and sets the machine variables for optimal operation and can share the machine variables and settings with other machines.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A system for performing an agricultural process, the system comprising a plurality of agricultural machines, wherein each agricultural machine is engaged in performing an aspect of the agricultural process, and each agricultural machine is in electronic communication with every other agricultural machine in the system using a standardized communication and control protocol such that the plurality of agricultural machines form a networked group, and wherein performance of the aspect of the agricultural process by each agricultural machine is substantially synchronized with performances of the aspects of the agricultural process by the other agricultural machines in the networked group based on information electronically communicated by each agricultural machine, wherein the system further includes one or more sensors engaged in performing a sensor aspect of the agricultural process, and each sensor being in electronic communication with the agricultural machines in the system using the standardized communication and control protocol such that the one or more sensors are part of the networked group.

2. The system as set forth in claim 1, wherein the plurality of agricultural machines includes—
  a first machine having a hardwired network connection;
  a second machine having both a hardwired network connection to at least one first machine in the networked group and a wireless network connection to at least one other second machine in the networked group; and
  a third machine having a wireless network connection to at least one second machine in the networked group.

3. The system as set forth in claim 2, wherein the first machine is an unmanned agricultural implement.

4. The system as set forth in claim 2, wherein the second machine is a manned agricultural tractor connected via the hardwired network connection to the first machine.

5. The system as set forth in claim 1, wherein substantial synchronization of performances of the aspects of the agricultural process by the plurality of agricultural machines is achieved substantially automatically.

6. The system as set forth in claim 1, wherein the information is selected from the group consisting of: geographic position, relative position, wayline position, speed, load level, and fill level.

7. The system as set forth in claim 1, wherein the system further includes a station engaged in performing a station aspect of the agricultural process, and the station being in electronic communication with the sensors and the agricultural machines in the system using the standardized communication and control protocol such that the station is part of the networked group.

8. A system for performing an agricultural process, the system comprising a plurality of agricultural machines, wherein each agricultural machine is engaged in performing an aspect of the agricultural process, and each agricultural machine is in electronic communication with every other agricultural machine in the system using a standardized communication and control protocol such that the plurality of agricultural machines form a networked group, and wherein performance of the aspect of the agricultural process by each agricultural machine is substantially synchronized with performances of the aspects of the agricultural process by the other agricultural machines in the networked group based on information electronically communicated by each agricultural machine, wherein the standardized communication and control protocol is an ISO 11783 Compliant Implement Control standard.

9. A system for performing an agricultural process, the system comprising:
  a plurality of agricultural machines, with each agricultural machine engaged in performing an aspect of the agricultural process, and each agricultural machine is in electronic communication with every other agricultural machine in the system using a standardized communication and control protocol such that the plurality of agricultural machines form a networked group, and wherein performance of the aspect of the agricultural process by each agricultural machine is substantially automatically synchronized with performances of the aspects of the agricultural process by the other agricultural machines in the networked group based on information electronically communicated by each agricultural machine, wherein the information is selected from the group consisting of: geographic position, relative position, wayline position, speed, load level, and fill level, the plurality of agricultural machines including—
    a first machine which is an unmanned agricultural implement and has a hardwired network connection,
    a second machine which is a manned tractor and has a hardwired network connection to at least one first machine in the networked group, a wireless network connection to at least one other second machine in the networked group, and a gateway device configured to extend the networked group to additional agricultural machines provided with wireless network connections, and
    a third machine which is a manned truck and has a wireless network connection to at least one second machine in the networked group, and a gateway device configured to extend the networked group to additional agricultural machines provided with wireless network connections,
  wherein—
    the standardized communication and control protocol is an ISO 11783 Compliant Implement Control standard;
    an ISO 11783 Virtual Terminal standard is used to create virtual terminals to facilitate providing output to and receiving input from an operator of the second machine and an operator of the third machine;
    the second machine has a computer area network bus, and wherein an ISO 11783 Task Controller standard is used to remotely inject an Object Pool for the virtual terminal into the computer area network bus; and
    an ISO 25119 Machine Directive standard is used to facilitate communication between and control of the first, second, and third machines.

10. A system for performing an agricultural process, the system comprising:
  a plurality of agricultural machines, with each agricultural machine engaged in performing an aspect of the agricultural process, and each agricultural machine is in electronic communication with every other agricultural machine in the system using a standardized communication and control protocol such that the plurality of agricultural machines form a networked group, and wherein performance of the aspect of the agricultural process by each agricultural machine is substantially automatically synchronized with performances of the aspects of the agricultural process by the other agricultural machines in the networked group based on information electronically communicated by each agricultural machine, wherein the information is selected from the group consisting of: geographic position, relative position, wayline position, speed, load level, and fill level, the plurality of agricultural machines including—
a first machine which is an unmanned agricultural implement and has a hardwired network connection,
a second machine which is a manned tractor and has a hardwired network connection to at least one first machine in the networked group, a wireless network connection to at least one other second machine in the networked group, and a gateway device configured to extend the networked group to additional agricultural machines provided with wireless network connections, and
a third machine which is a manned truck and has a wireless network connection to at least one second machine in the networked group, and a gateway device configured to extend the networked group to additional agricultural machines provided with wireless network connections,
wherein the system further includes one or more sensors engaged in performing a sensor aspect of the agricultural process, and each sensor being in electronic communication with the agricultural machines in the system using the standardized communication and control protocol such that the one or more sensors are part of the networked group.

11. The system as set forth in claim 10, wherein the system further includes a station engaged in performing a station aspect of the agricultural process, and the station being in electronic communication with the sensors and the agricultural machines in the system using the standardized communication and control protocol such that the station is part of the networked group.

12. A method of performing an agricultural process involving a plurality of agricultural machines, wherein each agricultural machine is engaged in performing an aspect of the agricultural process, the method comprising the steps of:
(1) placing each agricultural machine in electronic communication with every other agricultural machine involved in the agricultural process using a standardized communication and control protocol such that the plurality of agricultural machines form a networked group; and
(2) substantially synchronizing performance of the aspect of the agricultural process by each agricultural machine with performances of the aspects of the agricultural process by the other agricultural machines in the networked group based on information electronically communicated by each agricultural machine,
wherein one or more sensors are engaged in performing a sensor aspect of the agricultural process, and the method further including the step of placing each sensor in electronic communication with the agricultural machines engaged in the agricultural process using the standardized communication and control protocol such that the one or more sensors are part of the networked group.

13. The method as set forth in claim 12, wherein the plurality of agricultural machines includes—
a first machine having a hardwired network connection;
a second machine having both a hardwired network connection to at least one first machine in the networked group and a wireless network connection to at least one other second machine in the networked group; and
a third machine having a wireless network connection to at least one second machine in the networked group.

14. The method as set forth in claim 13, wherein the first machine is an unmanned agricultural implement.

15. The method as set forth in claim 14, wherein the second machine is a manned agricultural tractor connected via the hardwired network connection to the first machine.

16. The method as set forth in claim 12, wherein the step of substantially synchronizing performances of the aspects of the agricultural process by the plurality of agricultural machines is achieved substantially automatically.

17. The method as set forth in claim 12, wherein the information is selected from the group consisting of: geographic position, relative position, wayline position, speed, load level, and fill level.

18. The method as set forth in claim 12, wherein a station is engaged in performing a station aspect of the agricultural process, and the method further including the step of placing the station in electronic communication with the sensors and agricultural machines engaged in the agricultural process using the standardized communication and control protocol such that the station is part of the networked group.

19. A method of performing an agricultural process involving a plurality of agricultural machines, wherein each agricultural machine is engaged in performing an aspect of the agricultural process, the method comprising the steps of:
placing each agricultural machine in electronic communication with every other agricultural machine involved in the agricultural process using a standardized communication and control protocol such that the plurality of agricultural machines form a networked group; and
substantially synchronizing performance of the aspect of the agricultural process by each agricultural machine with performances of the aspects of the agricultural process by the other agricultural machines in the networked group based on information electronically communicated by each agricultural machine,
wherein the standardized communication and control protocol is an ISO 11783 Compliant Implement Control standard.

20. A method of performing an agricultural process involving a plurality of agricultural machines, wherein each agricultural machine is engaged in performing an aspect of the agricultural process, the method comprising the steps of:
placing each agricultural machine in electronic communication with every other agricultural machine involved in the agricultural process using a standardized communication and control protocol such that the plurality of agricultural machines form a networked group; and
substantially synchronizing performance of the aspect of the agricultural process by each agricultural machine with performances of the aspects of the agricultural process by the other agricultural machines in the networked group based on information electronically communicated by each agricultural machine,
wherein at least some of the agricultural machines are provided with a gateway device, and the method further including the step of extending the networked group to include additional agricultural machines using the gateway device.

21. A method of performing an agricultural process involving a plurality of agricultural machines, wherein each agricultural machine is engaged in performing an aspect of the agricultural process, the method comprising the steps of:

placing each agricultural machine in electronic communication with every other agricultural machine involved in the agricultural process using a standardized communication and control protocol such that the plurality of agricultural machines form a networked group;

substantially synchronizing performance of the aspect of the agricultural process by each agricultural machine with performances of the aspects of the agricultural process by the other agricultural machines in the networked group based on information electronically communicated by each agricultural machine;

incorporating a first set of the plurality of agricultural machines into the networked group; and dynamically incorporating additional agricultural machines into the networked group.

22. A method of performing an agricultural process involving a plurality of agricultural machines, wherein each agricultural machine is engaged in performing an aspect of the agricultural process, the method comprising the steps of:

placing each agricultural machine in electronic communication with every other agricultural machine involved in the agricultural process using a standardized communication and control protocol such that the plurality of agricultural machines form a networked group;

substantially synchronizing performance of the aspect of the agricultural process by each agricultural machine with performances of the aspects of the agricultural process by the other agricultural machines in the networked group based on information electronically communicated by each agricultural machine; and achieving a longer range for the networked group using a mesh networking technique wherein an intermediate gateway device associated with an intermediate agricultural machine in the networked group is used to route communication from a remote gateway device associated with a remote agricultural machine which is otherwise beyond a communication range of the networked group.

* * * * *